April 15, 1941.  C. E. ROGERS  2,238,373
APPARATUS FOR TREATING LIQUIDS CONTAINING BACTERIA AND SPORES
Original Filed July 2, 1934   2 Sheets-Sheet 1
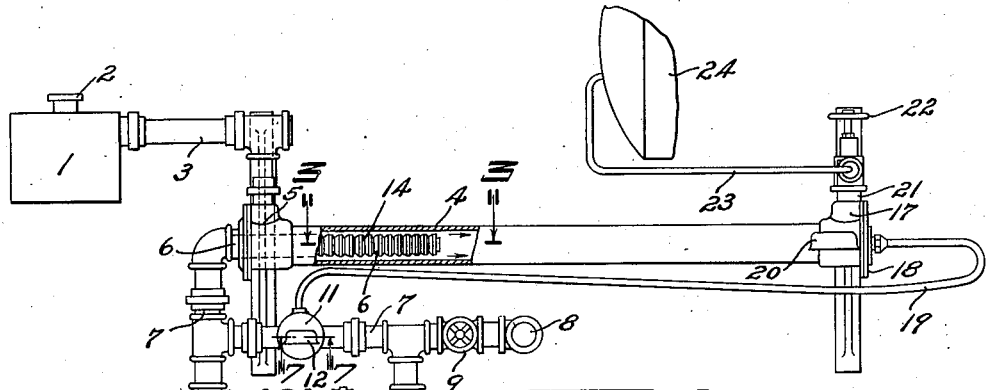
FIG. 1.
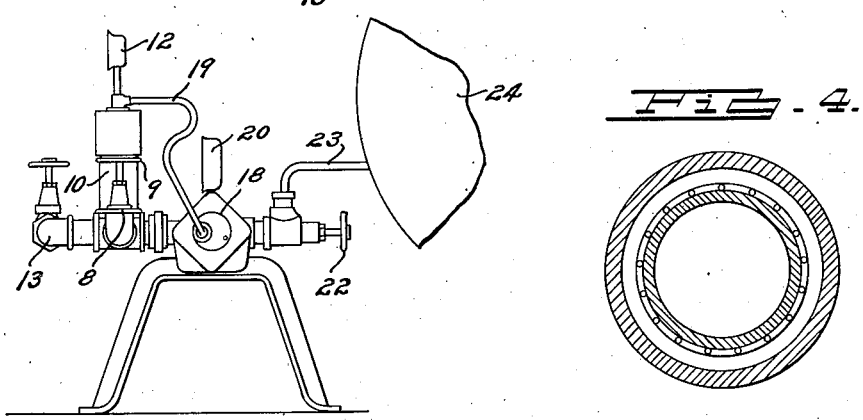
FIG. 2.
FIG. 4.
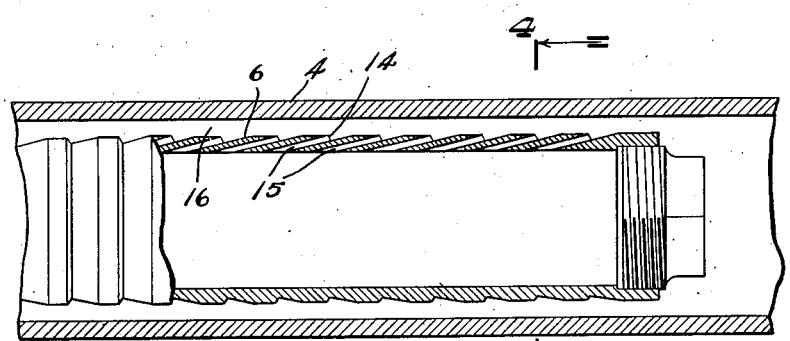
FIG. 3.
INVENTOR.
Charles E. Rogers
BY
ATTORNEY

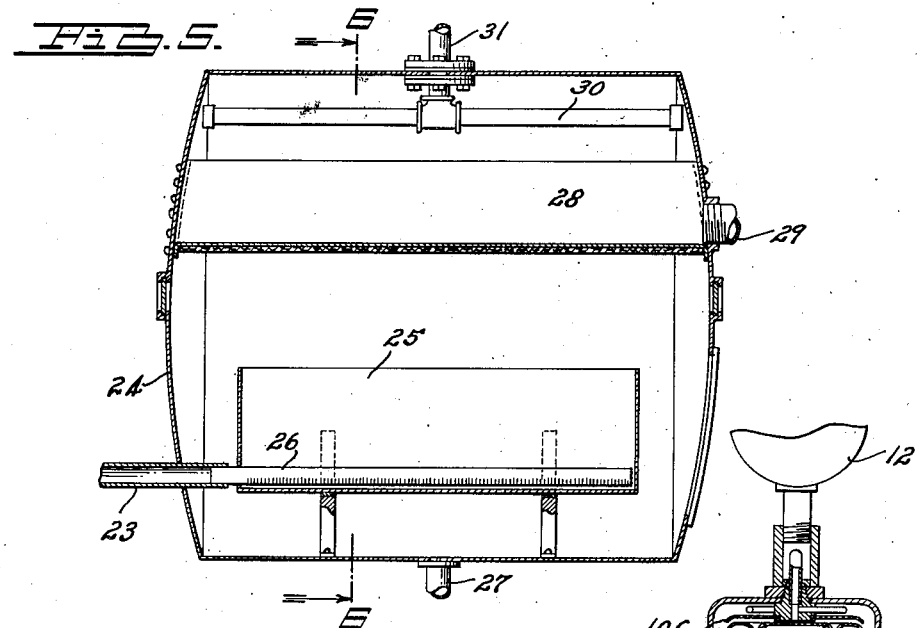
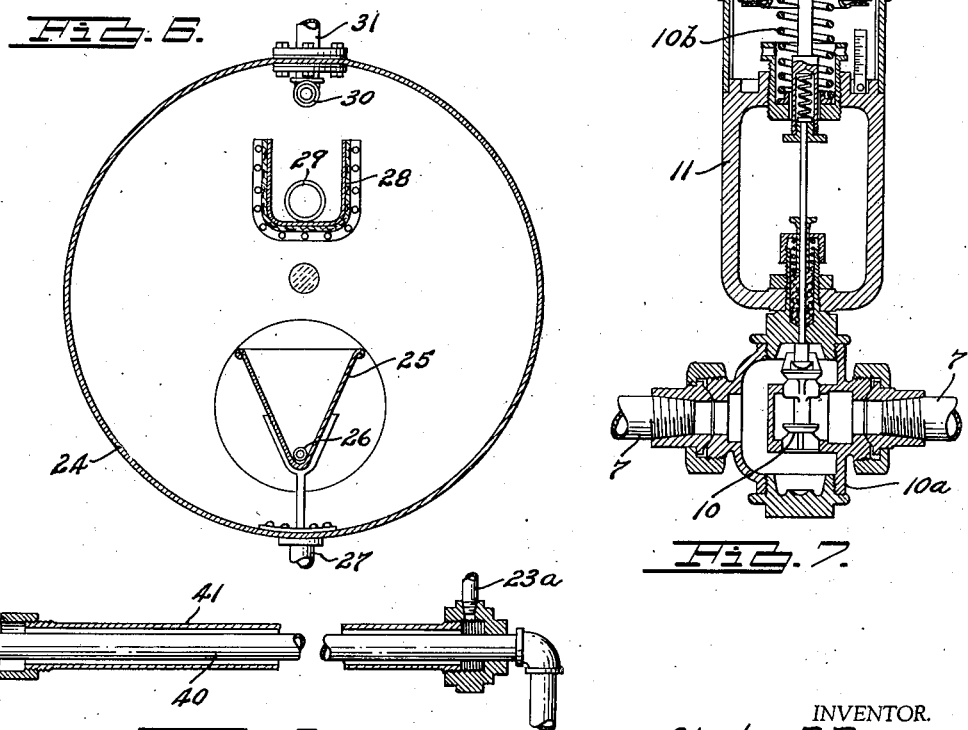

Patented Apr. 15, 1941

2,238,373

UNITED STATES PATENT OFFICE 2,238,373

APPARATUS FOR TREATING LIQUIDS CONTAINING BACTERIA AND SPORES

Charles E. Rogers, Novi, Mich., assignor to C. E. Rogers Company, Detroit, Mich., a corporation of Michigan Original application July 2, 1934, Serial No. 733,434, now Patent No. 2,115,470, dated April 26, 1938. Divided and this application March 28, 1938, Serial No. 198,391

5 Claims. (Cl. 99—251)

This invention relates to apparatus for treating milk and cream to render the same practically non-sporiparous and may be employed in treatment of other liquids containing bacteria, and is a division of my application Serial No. 733,434, entitled Method of deodorizing and pasteurizing liquids, filed July 2, 1934, now known as U. S. Patent No. 2,115,470 of April 26, 1938.

Heretofore, milk and cream have been subjected to what is known as the "pasteurizing process" in which the liquid is heated to a temperature not higher than 165 degrees Fahrenheit which is understood by the trade to be practically the highest temperature to which milk and cream may be subjected without detrimental chemical or physical change. Such treatment, however, does not eliminate the spores and this invention seeks to provide an apparatus for performing the same by which the milk or cream may be subjected to a temperature of practically 300 degrees F. without injury in odor or flavor or detrimental chemical change and not only are the spores practically eliminated but the deleterious odors and flavors with which milk is often contaminated are also eliminated. Thus the milk or cream that has deteriorated through development of bacteria and the freshness and flavor impaired by deleterious volatile matter may, by the process herein described, be eliminated and a product secured that has the odor and flavor of fresh milk or cream which will be retained for a materially greater period than is the case with pasteurized milk or cream.

The object of the invention therefore is to provide an apparatus wherein the milk and cream may be raised to a temperature approximately 300 degrees F. without production of detrimental odor, taste or deleterious physical or chemical change and thereby practically freeing the milk of bacteria producing spores.

I have discovered that it is possible to heat milk and cream to practically 300 degrees F. without detriment providing the heating and subsequent cooling are sufficiently rapid, that is, the time of heating to above a pasteurizing temperature and cooling to said temperature is performed in the neighborhood of three seconds of time.

The feature of the invention resides in the apparatus for heating the liquid wherein it may be uniformly heated throughout its mass to the high temperature and in association with which is provided a means for practically instantaneously discharging the heat from the fluid which may thereafter be cooled to any desired degree.

These and other objects and various novel features of the invention are hereinafter more fully described and claimed, and the preferred form of apparatus embodying my invention is shown in the accompanying drawings in which—

Fig. 1 is a plan view of the apparatus partially in section.

Fig. 2 is an end elevation thereof.

Fig. 3 is a sectional elevation of a portion of a convenient form of heating device.

Fig. 4 is a cross section thereof taken on line 4—4 of Fig. 3.

Fig. 5 is a sectional elevation of a convenient form of vacuum chamber utilized in the cooling of the treated milk.

Fig. 6 is a cross section taken on line 6—6 of Fig. 5.

Fig. 7 is a section taken on line 7—7 of Fig. 1 showing the steam control valve.

Fig. 8 is a longitudinal section of a different form of heater tube.

The essential characteristic of this invention resides in the means for quickly heating the milk uniformly throughout its mass to a high degree and practically instantaneously discharging the heat therefrom or at least sufficiently rapidly as to prevent a detrimental physical or chemical change in the fluid due to the heating to so high a degree. One form of heating device for quick heating of the liquid is shown principally in Figs. 1, 2 and 3 but other forms may be utilized.

The form of heater shown operates to inject steam into a comparatively thin film of liquid under treatment, it being understood that by "liquid" is meant any of the known liquids requiring such treatment to eliminate the bacteria and spores.

The apparatus shown consists of a pump 1 taking its source of supply through an inlet 2 and discharging the same through a pipe 3 into a cylinder 4. The pipe 3 is connected to a header 5 on the cylinder 4 and to this header is connected a heater tube 6 extending through the header and into the cylinder 4 part way of its length. The liquid discharged through the pipe 3 into the header lies in a thin film circumferentially of the tube 6 within the header 5 and cylinder 4. The heater tube 6 is connected to a steam supply conduit 7 and has an inlet 8 connected with a source of supply. A valve 9 may be positioned in the conduit 7 adjacent the inlet and there is also in the conduit 7 a valve 10 and in the chambered member 11 is a temperature actuated device, a convenient form of which is shown in Fig. 7. This is a common known form of temperature control valve in which a bellows member 10c is mounted in a chambered member 11 which by expansion tends to close the valve 10 in the valve housing 10a forming part of the conduit 7. There is a spring 10b tending to contract the bellows member and open the valve and on the upper end of the chamber 11 is a temperature gauge 12. The conduit 7 connects directly to the member 10a and is continued on the opposite side to connect with the heater conduit 6 and there is also a valve controlled by-pass conduit 13 connected with the inlet and passing around the temperature controlled valve 10 and connected with the portion of the conduit 7 connected to the heater conduit 6, it being desirable, as for instance in a cleaning operation, to inject live steam directly into the tube 4 and about the associated parts.

The heater conduit, particularly the portion extending into the tube 4, is provided with a series of circumferential grooves 14 in the bottoms of which apertures 15 are provided leading to the interior of the tube 6 and so inclined to the axis of the tube as to direct the steam forwardly in the direction of the arrow in the tube 4. The milk or other fluid being treated passes in the space 16 between the wall of the heater tube 6 and cylinder 4 and thus is in a thin film and is penetrated by the steam jets issuing from the apertures 15 during the period of its passing from the receiving end of the tube 4 to the end of the tube 6. Thus, due to the fluid being in a comparatively thin film and of its being passed rapidly by the pump through this space, the fluid is practically uniformly heated to the steam temperature by the time it passes the end of the tube 6. The length of this tube 4 to the header 17 should be such that, with milk or cream at least, not more than two seconds of time should elapse but this may be varied slightly without injury to the milk due to the instantaneous cooling thereof hereinafter described. The header 17 has a plate 18 at its outer face to a recess of which the tube 19 opens which tube connects to the diaphragm or expansion device in the chamber 11. A gauge, indicated at 20, is provided to enable the operator to read the temperature of the fluid at this point while the gauge 12 enables the operator to determine the temperature to which the apparatus for operating the valve 10 is subjected.

The tube 19 and bellows member 10c to which it opens are practically filled with a volatile fluid highly responsive to variations in temperature and the structure shown in Fig. 7 is so set as to maintain the temperature of the liquid being treated practically constant. When the temperature is maintained at about 300 degrees F. for a short period both the bacteria and spores are destroyed. If milk or cream is being treated the period should not exceed three seconds of time. The header also has connected therewith a discharge conduit 21 on which is a valve 22 and a conduit 23 leads from the tube 21 to and discharges into a vacuum chamber 24 which is shown diagrammatically in Figs. 1 and 2 and shown more in detail in Figs. 5 and 6. To maintain a temperature of 300 degrees in the heater tube by means of steam, the steam, as is well known, must have a pressure of about 100 pounds per square inch. The valve 22 between the heater tube 4 and the tube 23 leading to the vacuum chamber is adjustable by means of the hand wheel 22. The temperature of the fluid in the tube 4 is indicated by the gauge 20 and if the temperature is too low the valve must be closed slightly to bring up the pressure in the tube 4 in order that the desired temperature may be attained. As the liquid passes the valve 22 to the conduit 23, the pressure must drop due to the tube freely discharging to the vacuum chamber 24. The apparatus is thus controllable to maintain pressures and temperatures in the tube 4 and the drop in pressure between the tube 4 and 23 tends to collapse and crack the spores which are still subject to the heat of the liquid before the heat is discharged therefrom in the vacuum chamber.

This vacuum chamber is preferably provided with a V shaped trough 25 adjacent its bottom into which an extension 26 of the tube 23 is positioned. This tube 26 has a series of small apertures or slots therein to permit the fluid to pass freely from the tube 26 and as this fluid overflows the upper edge of the trough 25 it drops to the bottom of the vacuum chamber 24 and may be instantly drawn off through a discharge conduit 27. With milk or cream the liquid should be withdrawn quickly from influence of the vacuum as the casein and curd content tend to harden if the liquid remains in the chamber. Therefore the liquid should be constantly withdrawn therefrom as rapidly as it is discharged thereinto so no great amount of liquid is in the chamber at any time. The vacuum chamber is of a type in which there is a trough 28 extending across the same above the trough 25 and near the top of the chamber and at its end the tube 29 is provided exteriorly of the chamber which is to be understood as being connected with the vacuum pump.

A spray of water may be discharged into the trough 28 by means of a pipe 30 having a series of apertures therein and connected with a source of supply by a tube 31. This spray falls into the trough 28 and vapors rising in the vacuum chamber from the fluid discharged thereinto pass through the spray to enter the trough 28 and thus the gases are drawn off from the chamber by the vacuum pump which maintains about a twenty-five inch vacuum in the chamber 24.

Introduction of the highly heated fluid under pressure into the vacuum chamber under influence of the vacuum causes the same to practically explode and to give up its heat and to free the fluid of the deleterious odors and flavors and this cooling is practically instantaneous from approximately 300 degrees temperature of the fluid to the boiling temperature of the chamber which is ordinarily about 130 degrees and as the fluid is discharged from the vacuum chamber to the conduit 27 it may pass through a device for cooling the same materially below the temperature of the vacuum chamber.

The heater here shown injects steam directly into the body of milk, cream or other material being treated. This is not material in the case of milk or cream wherein the cream is to be used in the making of butter or where the milk is to be condensed or dried. If the milk or cream is for table use in which it is desired to be practically in its natural state, the heater device should consist of an imperforate steam tube 40 concentrically arranged in an outer tube 41 between which the fluid is to be passed in a thin film to discharge through the tube 23a to the vacuum chamber. The tubes 40 and 41 should be of sufficient length to raise the temperature of the liquid under treatment to the desired degree before discharging to the vacuum chamber.

In either form of the heater, however, the essential characteristic is in the rapidity with which the milk is raised from pasteurizing temperature to 300 degrees F. and dropped to pasteurizing temperature or below. The movement of the milk or cream when in contact with the heater conduit must be rapid to prevent its caking on the tube. Therefore the pump should be of such capacity as to place the fluid under sufficient pressure as to cause it to traverse the conduits to the point of discharge into the vacuum chamber very rapidly and the capacity of the heater is governed by the volume of fluid to be heated per unit of time and its speed of movement relative to the heating element. Thus it will be observed in recapitulation that by raising the fluid very quickly to a high degree of temperature and then discharging into a vacuum chamber of a sufficiently high degree of vacuum, the heat is practically instantly discharged from the body of fluid and in the treatment of any fluid, particularly milk and cream, this period of heating should not exceed approximately four seconds of time from the point of heating at high heat to the point of entering the vacuum chamber. Thus the pump must operate and the conduits 4, 21 and 23 should be of such length in comparison to the capacity of the pump as to cause the fluid to traverse the tube to the vacuum chamber before a detrimental physical or chemical change takes place in the fluid. Under the conditions stated, the milk or cream being treated will flow from the vacuum chamber so nearly free from spores as to be practically sterile.

From the foregoing description it is believed evident that various objects of the invention are attained by the apparatus described, and it is to be understood that various changes may be made in the apparatus and that the temperatures to which the liquid is subjected may be varied somewhat from the specific temperatures mentioned, depending somewhat upon the character of liquid being treated, without departing from the spirit and scope of the invention as set forth in the appended claims.

Having thus briefly described my improved apparatus for treating liquids containing bacteria and spores, what I claim and desire to secure by Letters Patent of the United States is—

1. Means for pasteurizing and deodorizing lacteal liquids for the destruction of bacteria and spores which comprises a vacuum chamber, a conduit for discharge of liquid to the vacuum chamber, said conduit being of two sections, a pump for supplying the liquid under pressure to the first section, means for applying heat to pasteurize the liquid in the said first section, a pressure regulating valve between the two sections for maintaining pressure on the liquid in the first section, said second section extending from the valve and opening to the vacuum chamber whereby the liquid in the second section flows under its internal heat at a reduced pressure and is instantly cooled upon discharge to the vacuum chamber, and means for separately discharging the liquid and the volatile matter from the vacuum chamber.

2. Apparatus for the pasteurization and deodorization of lacteal liquids comprising a vacuum chamber, means including a pump and a conduit for passing the fluid from a source of supply to the vacuum chamber, means for injecting steam into the fluid in one section of the conduit wherein the temperature of the liquid is raised to approximately 300 degrees F. and attains approximately a pressure of 100 pounds per square inch, an adustable pressure regulating valve at the end of the heating section for maintaining the desired pressure on the liquid therein, the succeeding section of the conduit leading from the valve and discharging into the vacuum chamber whereby the liquid in the said last named section is reduced in pressure while under internal heat, the liquid in discharging from the said last named section due to heat and pressure being broken up into a fog-like state and instantly cooled, and a conduit at the bottom of the vacuum chamber for discharge of the fluid.

3. Means for pasteurizing and deodorizing lacteal liquids for the destruction of bacteria and spores which comprises a vacuum chamber, a pump and a conduit for discharge of the liquid to the vacuum chamber, said conduit comprising a heating section in which the fluid is heated under pressure, a section connected therewith and discharging to the vacuum chamber, and an adjustable pressure regulating valve between the two said sections whereby the liquid in the heating section may be maintained under the desired pressure while being heated and in the other section reduced in pressure wherein the liquid flows while under internal heat prior to discharge to the vacuum chamber.

4. Means for pasteurizing and deodorizing lacteal liquids for the destruction of bacteria and spores comprising a vacuum chamber, a pump and a conduit for discharge of liquid to the vacuum chamber, said conduit comprising a heating section wherein the fluid is heated and a second section receiving the fluid therefrom and discharging to the vacuum chamber, and means between the sections for restricting the rapidity of flow whereby the liquid in the first section may be held under a predetermined pressure while directly subject to heat, the second section due to its opening at the discharge end to influence of the vacuum chamber providing for an instantaneous reduction in pressure as the liquid passes from the heating section to the said second section.

5. Means for pasteurizing and deodorizing lacteal liquids for the destruction of bacteria and spores comprising a vacuum chamber, a pump and a conduit for discharge of liquid to the vacuum chamber, said conduit comprising a heating section wherein the fluid is heated and a second section receiving the fluid therefrom and discharging to the vacuum chamber, and means for maintaining the liquid under predetermined pressure in the first section, the second section being open to influence of the vacuum in the vacuum chamber providing for an instantaneous reduction in pressure as the liquid passes thereinto and wherein it flows under its internal heat for a period prior to discharge to the vacuum chamber.

CHARLES E. ROGERS.